United States Patent
Yoon

(10) Patent No.: US 10,006,540 B2
(45) Date of Patent: Jun. 26, 2018

(54) METHOD OF SETTING REFERENCE POSITION OF ACTUATOR IN AUTOMATED MANUAL TRANSMISSION

(71) Applicant: Hyundai Motor Company, Seoul (KR)

(72) Inventor: Young Min Yoon, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 304 days.

(21) Appl. No.: 15/081,312

(22) Filed: Mar. 25, 2016

(65) Prior Publication Data

US 2017/0130822 A1     May 11, 2017

(30) Foreign Application Priority Data

Nov. 5, 2015   (KR) .................. 10-2015-0155221

(51) Int. Cl.
| | | |
|---|---|---|
| F16H 59/70 | (2006.01) | |
| F16H 61/28 | (2006.01) | |
| F16H 61/688 | (2006.01) | |
| F16H 63/02 | (2006.01) | |

(52) U.S. Cl.
CPC ............. *F16H 59/70* (2013.01); *F16H 61/28* (2013.01); *F16H 61/688* (2013.01); *F16H 2061/283* (2013.01); *F16H 2063/025* (2013.01)

(58) Field of Classification Search
None
See application file for complete search history.

(56) References Cited

FOREIGN PATENT DOCUMENTS

| JP | 58-180327 A | 10/1983 |
|---|---|---|
| KR | 10-2011-0011250 | 2/2011 |
| KR | 10-2011-0123372 | 11/2011 |
| KR | 10-2013-0116757 A | 10/2013 |
| KR | 10-1504066 | 3/2015 |
| KR | 10-2015-0063277 | 6/2015 |
| KR | 10-2013-0076486 A | 7/2015 |
| WO | 2000-073682 | 12/2000 |

*Primary Examiner* — Colby M Hansen
(74) *Attorney, Agent, or Firm* — Brinks Gilson & Lione

(57) ABSTRACT

A method of setting a reference position of an actuator in an automated manual transmission includes: performing Hall signal comparison by comparing, by a controller, a signal value of Hall sensors with a reference signal value; performing first movement by moving, by the controller, a finger of the actuator to a first end in a shifting direction by a preset distance if the signal values are identical; performing a first selection checking by checking whether selecting operation is enabled; performing a second movement by moving the finger to a second end in the shifting direction by a distance that is twice the preset distance if selecting operation is not enabled; performing a second selection checking by checking whether selecting operation is enabled; and performing a third movement by moving the finger to the first end in the shifting direction by the preset distance if selecting operation is not enabled.

8 Claims, 6 Drawing Sheets

METHOD OF SETTING REFERENCE POSITION OF ACTUATOR IN AUTOMATED MANUAL TRANSMISSION

CROSS REFERENCE TO RELATED APPLICATION

The present application claims priority to and the benefit of Korean Patent Application No. 10-2015-0155221, filed Nov. 5, 2015, which is incorporated by reference in its entirety.

FIELD

The present disclosure generally relates to a method of setting a reference position of an actuator in an automated manual transmission.

BACKGROUND

The statements in this section merely provide background information related to the present disclosure and may not constitute prior art.

FIG. 1 illustrates the gear-shift mechanism of a typical automated manual transmission to which the present disclosure can be applied, and shows in detail a double-clutch transmission.

Referring to FIG. 1, two fingers F, which are vertically moved to perform a selecting operation and are rotated to perform a shifting operation, are provided. An odd-numbered stage selecting actuator 9 and an even-numbered stage selecting actuator 13, which vertically move the two fingers F, respectively, and an odd-numbered stage shifting actuator 11 and an even-numbered stage shifting actuator 15, which rotate the two fingers F, respectively, are provided. As shown in FIG. 2, the two fingers F are configured to perform a selecting operation by vertically moving in respective gear-shift gate patterns and perform a shifting operation by horizontally moving in the patterns, thus performing a desired gear-shift operation.

Here, the odd-numbered stage selecting actuator 9 and the even-numbered stage selecting actuator 13 are implemented as a solenoid actuator, and the odd-numbered stage shifting actuator 11 and the even-numbered stage shifting actuator 15 are implemented as a motor. To recognize the positions of the fingers F based on the operation of the motor due to the characteristics of the motor, a separate position sensor is required. However, the position sensor is disadvantageous in that it increases the production cost of products and is additionally unfavorable in the configuration of packages and the weight of products.

In order to recognize the positions of the fingers, during the startup of a vehicle, the fingers are located at specific reference positions. If it is checked that the fingers are located at the specific reference positions, the subsequent rotation of the motor is calculated based on the reference positions, thus tracking and recognizing the positions of the fingers.

For reference, in FIG. 2, the reference positions of the two fingers F are indicated. However, since it cannot be guaranteed that the fingers F are located at the reference positions, such as those shown in the drawing, during the startup of the vehicle, an initialization operation of moving the fingers F to the reference positions must be performed.

FIG. 3 illustrates a conventional method of setting the reference position of a finger, that is, an actuator. In the drawing, during ignition-on of a vehicle, a finger F is moved to both ends in a shifting direction in the sequence of numbers, as shown in FIG. 3, and thereafter the full stroke of the finger F is checked. When the full stroke satisfies a preset value, the finger F reaches a position where selecting is enabled if the finger moves to the position that is half of the full stroke. Therefore, it is possible to check and set the accurate reference position of the finger F by moving the finger F to the position where selecting is enabled and by then reciprocating the finger F in a selecting direction.

However, the above-described initialization procedure is problematic in that noise and a time delay are caused due to gear engagement because the finger F is fully moved in the shifting direction.

SUMMARY

The present disclosure provides a method of setting a reference position of an actuator in an automated manual transmission, which can reduce the time required for gear engagement and inhibit or prevent noise from occurring due to gear engagement because the engagement of gears is not conducted during an initialization procedure of setting the reference position of the actuator.

In order to accomplish the above object, the present disclosure provides a method of setting a reference position of an actuator in an automated manual transmission, including performing Hall signal comparison by comparing, by a controller, a signal value of Hall sensors with a reference signal value; performing a first movement by moving, by the controller, a finger of the actuator to a first end in a shifting direction by a preset distance if the signal value of Hall sensors is identical to the reference signal value as a result of performing the Hall signal comparison; performing a first selection checking by checking, by the controller, whether a selecting operation is enabled at a moved position of the finger after the first movement; performing a second movement by moving, by the controller, the finger to a second end in the shifting direction by a distance that is twice the preset distance if a selecting operation is not enabled as a result of performing the first selection checking; performing a second selection checking by checking, by the controller, whether a selecting operation is enabled at a moved position of the finger after the second movement; and performing a third movement by moving, by the controller, the finger to the first end in the shifting direction by the preset distance if a selecting operation is not enabled as a result of performing the second selection checking.

The reference signal value may be a signal value of the Hall sensors when the finger is located at the reference position during an End of Line (EOL) procedure.

The method may further include, if the signal value of the Hall sensors is different from the reference signal value as a result of performing the Hall signal comparison, moving, by the controller, the finger in the shifting direction so that the signal value of the Hall sensors becomes identical to the reference signal value, and then performing the first movement.

The preset distance may be a distance by which the finger is moved in the shifting direction from a center portion of a selected clearance to a point deviating from the selected clearance.

The method may further include, if the selecting operation is enabled as a result of performing the first selection checking, moving, by the controller, the finger to the first end in the shifting direction by a specific distance, and then again performing the first selection checking.

The method may further include, if the selecting operation is enabled as a result of performing the second selection checking, moving, by the controller, the finger to the second end in the shifting direction by a specific distance, and then again performing the second selection checking.

The specific distance may be a distance by which the finger is moved while a motor is rotating at an angle of approximately 360°.

In accordance with the method of setting the reference position of the actuator in the automated manual transmission, having the above configuration, the position of a shifting actuator may be initialized to a reference position without performing gear engagement. As a result, the time required to set the reference position of the shifting actuator may be reduced, and noise caused by gear engagement may also be reduced.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
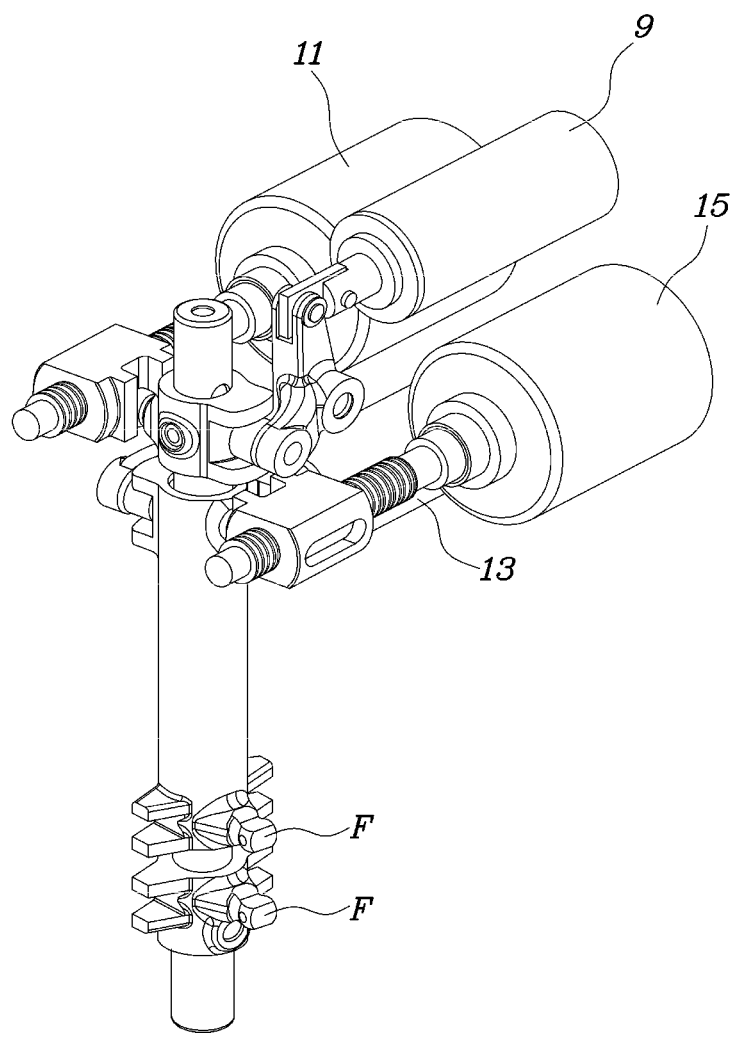
FIG. 1 is a diagram illustrating the gear-shift mechanism of a conventional automated manual transmission.
Figure 2:
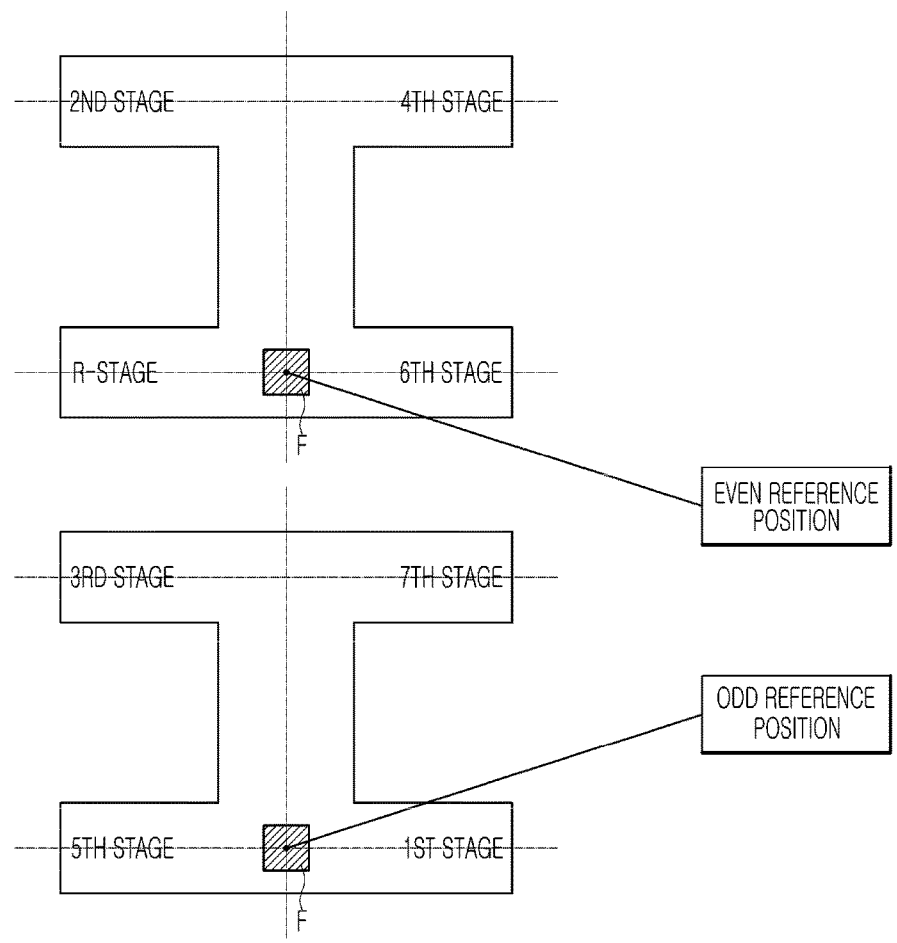
FIG. 2 is a diagram showing gear-shift gate patterns and the reference positions of fingers based on the gear-shift mechanism of FIG. 1.
Figure 3:
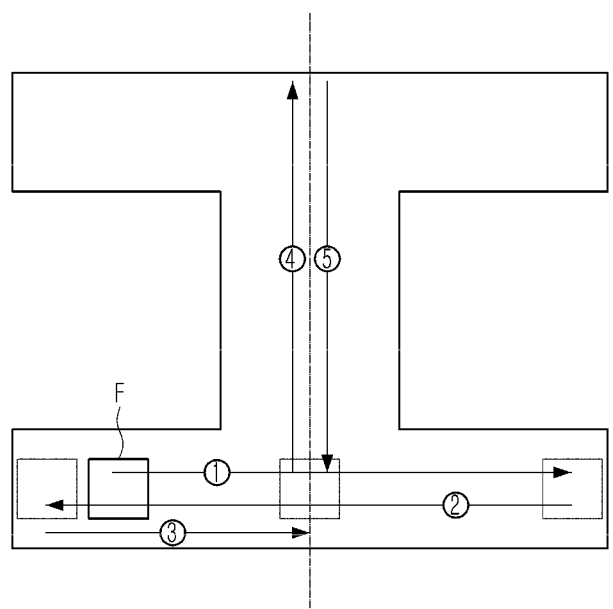
FIG. 3 is a diagram illustrating a conventional method of setting the reference position of an actuator.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 4:
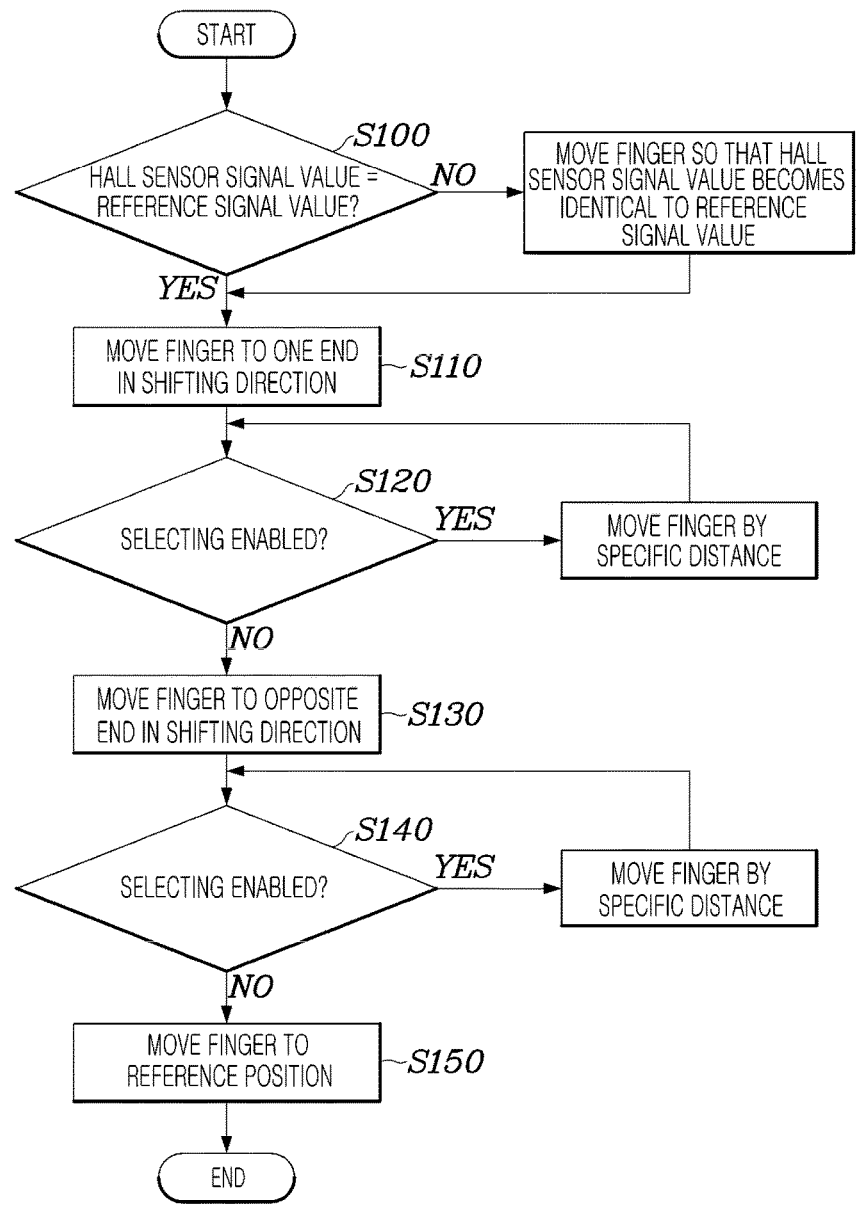
FIG. 4 is a flowchart showing a method of setting the reference position of an actuator in an automated manual transmission.

FIG. 4 is a flowchart showing a method of setting the reference position of an actuator in an automated manual transmission according to the present disclosure. Referring to FIG. 4, the method of setting the reference position of the actuator in the automated manual transmission may include the Hall signal comparison step S100 of a controller comparing the signal value of Hall sensors with a reference signal value; the first movement step S110 of, when the signal value of the Hall sensors is identical to the reference signal value as a result of the Hall signal comparison step S100, the controller moving a finger F to one end in a shifting direction by a preset distance; the first selection checking step S120 of, after the first movement step S110, the controller checking whether a selecting operation is enabled at the moved position of the finger F; the second movement step S130 of, if the selecting operation is not enabled as a result of performing the first selection checking step S120, the controller moving the finger F to an opposite end in the shifting direction by a distance that is twice the preset distance; the second selection checking step S140 of, after the second movement step S130, the controller checking whether a selecting operation is enabled at the moved position of the finger F; and the third movement step S150 of, if the selecting operation is not enabled as a result of performing the second selection checking step S140, the controller moving the finger F to one end in the shifting direction by a preset distance.

The Hall sensors are respectively configured on motors for driving an even-numbered stage shifting actuator and an odd-numbered stage shifting actuator, and are configured to output different signal values depending on the electrical angles of the rotors of the motors.

In brief, three Hall sensors, which are arranged at intervals of an electrical angle of approximately 120°, are provided in each of the motors provided in the respective shifting actuators, and an integrated signal of pulse signals output from the respective Hall sensors may be regarded as the signal value of the Hall sensors. Therefore, the controller may detect the current rotational position of the corresponding motor based on the Hall sensor signal value, which indicates the pulse signals output from the Hall sensors.

In the present technology, since it cannot be guaranteed that, during ignition-on (IG-ON) of the vehicle, the finger F will be located at a reference position, the controller compares the signal value of the Hall sensors with a reference signal value so as to initialize the position of the finger F at step S100. Here, the reference signal value may be set to the signal value of the Hall sensors when the finger F is located at the reference position during an End Of Line (EOL) procedure.

That is, before a vehicle is released, a transmission EOL procedure may be performed in a transmission factory. At this time, the reference signal value, which is the signal value of the Hall sensors when the finger F is located at the reference position, may be stored. More specifically, in the EOL procedure, after the reference points of the selecting actuators has been learned, the signal value of the Hall sensors may be stored as EOL data and is manufactured in the form of a barcode. Thereafter, in a vehicle factory, the reference signal value may be checked using the barcode, and then stored in the controller.

Therefore, the controller may compare such a pre-stored reference signal value with the current signal value of the Hall sensors, and may then detect a degree by which the finger F deviates from the reference position. Here, the reference signal value may be variously set according to the vehicle, and is not limited to a specific value.

If, as a result of performing the Hall signal comparison step S100, the signal value of the Hall sensors is identical to the reference signal value, the controller determines that the selecting actuators do not have an error based on the signal value of the Hall sensors, and proceeds to the subsequent first movement step S110.

In contrast, if, as a result of performing the Hall signal comparison step S100, the signal value of the Hall sensors is different from the reference signal value, the controller moves the finger F in the shifting direction so that the signal value of the Hall sensors becomes identical to the reference signal value, and may then perform the first movement step.

For reference, Table 1 shows the signal value of the Hall sensors, which is output depending on the rotational position of the corresponding motor.

TABLE 1

| U | 1 | 1 | 0 | 0 | 0 | 1 |
|---|---|---|---|---|---|---|
| V | 0 | 1 | 1 | 1 | 0 | 0 |
| W | 0 | 0 | 0 | 1 | 1 | 1 |

Referring to Table 1, when the current signal value of the Hall sensors is (0,1,0), and the reference signal value is (0,0,1), the signal value of the Hall sensors has a difference of 2 pulses from the reference signal value, and thus the controller rotates the motor by approximately 120° in a forward direction, thus allowing the signal value of the Hall sensors to be identical to the reference signal value. In this procedure, the position of the finger F may be adjusted while the finger F is moving in the shifting direction.

In this way, the position of the finger F may be primarily corrected using the signal value of the Hall sensors. However, it is difficult to consider that each shifting actuator has been initialized to the reference position by merely utilizing position correction based only on the Hall sensor signal value. Therefore, after moving the finger F so that the signal value of the Hall sensors becomes identical to the reference signal value, the controller performs the first movement step S110.

At the first movement step S110, the controller moves the finger F to one end in the shifting direction by a preset distance. After the first movement step S110, the controller checks whether a selecting operation is enabled at the moved position of the finger F at step S120. If the selecting operation is not enabled, the controller determines that a current state is a normal state, and performs the second movement step S120 that is a subsequent control step.

Here, the preset distance is characterized by being the distance by which the finger F moves in the shifting direction from the center portion of a selected clearance to a point deviating from the selected clearance. For reference, the selected clearance refers to a pattern area in which the finger F can perform a selecting operation, and may be measured in an EOL procedure. The selected clearance measured in the EOL procedure is stored as EOL data and may be manufactured in the form of a barcode. The corresponding barcode is configured to be read in a vehicle factory and to store the selected clearance information in the controller.

That is, during ignition-on of the vehicle (IG-ON), when the finger F is located at the reference position or is located close to the one end with respect to the reference position, a selecting operation cannot be performed at the position of the finger F after the first movement step S110. However, during the ignition-on (IG-ON), when the finger F is located close to the opposite end with respect to the reference position, a selecting operation can be performed at the position of the finger F even if the finger F is moved to the one end by the preset distance at the first movement step S110.

Therefore, as a result of performing the first selection checking step S120, if the selecting operation can be performed, the controller performs correction by moving the finger F to the one end in the shifting direction by a specific distance, and then may again perform the first selection checking step S120.

Here, the specific distance is characterized by being a distance by which the finger F is moved while the motor is rotating at an angle of approximately 360°. Thus, it can be seen that, since the signal value of the Hall sensors is identical to the reference signal value, a distance error corresponding to a multiple of 6 pulses of the Hall sensor signal value occurs if an error has occurred in the position of the finger F. In this case, the difference of 6 pulses of the Hall sensor signal value is identical to the difference when the motor rotates at an angle of approximately 360°. Accordingly, the controller checks whether a selecting operation is enabled at the moved position of the finger F while moving the finger F to the one end by a specific distance, thus correcting the finger F to the reference position.

Meanwhile, as a result of performing the first selection checking step S120, if the selecting operation is not enabled, the controller moves the finger F to the opposite end in the shifting direction by a distance that is twice the preset distance at step S130, and checks whether a selecting operation is enabled at the moved position at step S140.

For example, during the ignition-on (IG-ON) of the vehicle, when a position error occurs because the finger F is located close to the one end with respect to the reference position, the selecting operation may be performed even if the finger F is moved to the opposite end by the distance that is twice the preset distance after the first selection checking step S120.

In this way, as a result of performing the second selection checking step S140, if the selecting operation is enabled, the controller moves the finger F to the opposite end in the shifting direction by a specific distance, and then again performs the second selection checking step S140.

Therefore, the controller performs position correction so that the finger F is moved to the opposite end by the specific distance, thus accurately moving the finger F to the reference position. Here, the signal value of the Hall sensors is identical to the reference signal value, and thus the specific distance may be equally set to the distance by which finger is moved while the motor is rotating at an angle of approximately 360°.

FIGS. 5 to 8 are diagrams showing a method of setting the reference position of an actuator in an automated manual transmission according to an embodiment of the present disclosure.

Figure 5:
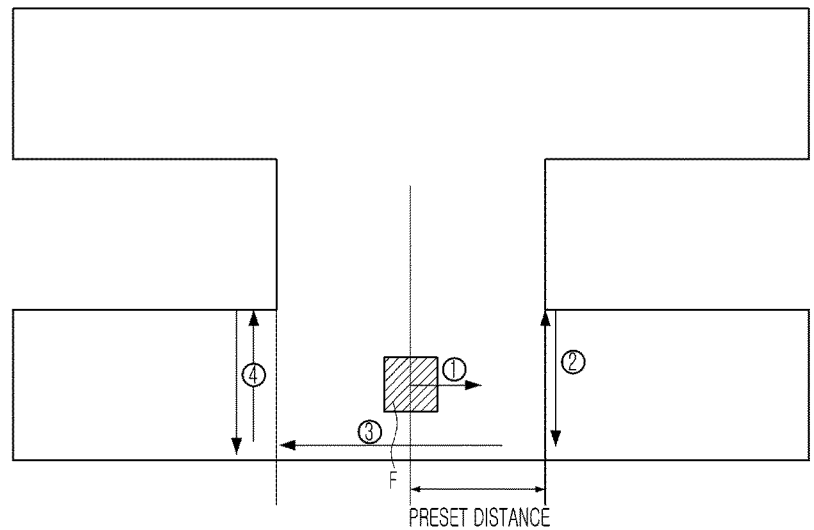
FIGS. 5 to 8 are diagrams showing a method of setting the reference position of an actuator in an automated manual transmission.

First, the embodiment of FIG. 5 illustrates a method of setting the reference position of a shifting actuator when the finger F is located at a reference position. Here, since the signal value of Hall sensors is identical to a reference signal value, the controller immediately moves the finger F to one end in a shifting direction by a preset distance (①). Thereafter, the controller checks whether a selecting operation is enabled at the moved position of the finger F (②). If it is checked that a selecting operation is not enabled, the controller moves the finger F to an opposite end in the shifting direction by a distance that is twice the preset distance (③). Thereafter, the controller checks whether a selecting operation is enabled at the moved position of the finger F (④). After it is checked that a selecting operation is not enabled, the controller may maintain the position of the finger F by moving the finger F to the one end in the shifting direction by the preset distance.

Figure 6:
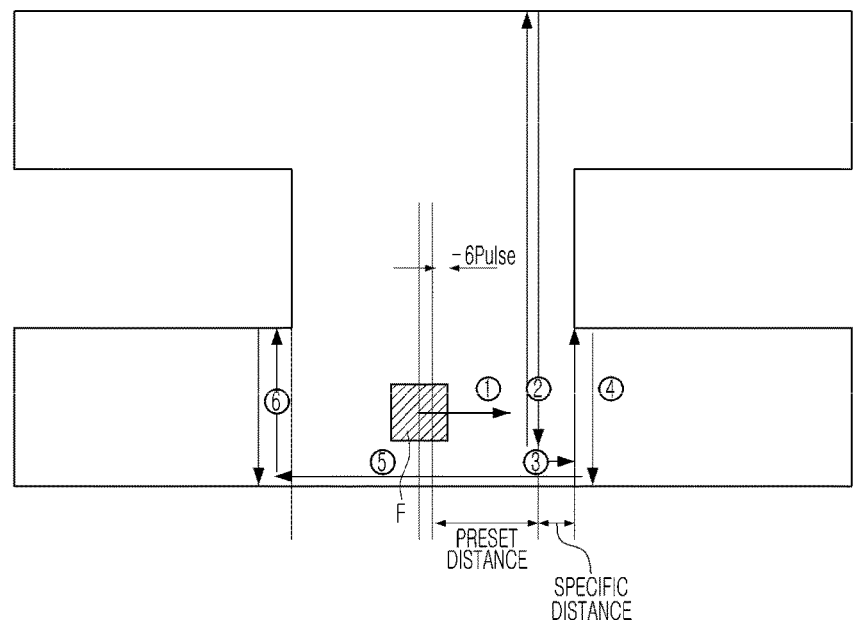

FIG. 6 illustrates a method of setting the reference position of the actuator when the finger F is located close to an opposite end with respect to the reference position. In particular, the present embodiment relates to the case where the signal value of Hall sensors is identical to the reference signal value. The controller moves the finger F to one end in a shifting direction by a preset distance (①). Thereafter, the controller checks whether a selecting operation is enabled at the moved position of the finger F (②). Since the selecting operation is enabled, the controller performs position correction by further moving the finger F to the one end in the shifting direction by a specific distance (③). Thereafter, the controller again checks whether a selecting operation is enabled at the moved position of the finger F (④). If it is checked that a selecting operation is not enabled, the controller moves the finger F to the opposite end in the shifting direction by a distance that is twice the preset distance (⑤). Thereafter, the controller checks whether a selecting operation is enabled at the moved position of the finger F (⑥). If it is checked that when a selecting operation is not enabled at the moved position of the finger F, the controller may initialize the reference position of the shifting actuator by moving the finger F to the one end in the shifting direction by the preset distance.

Figure 7:
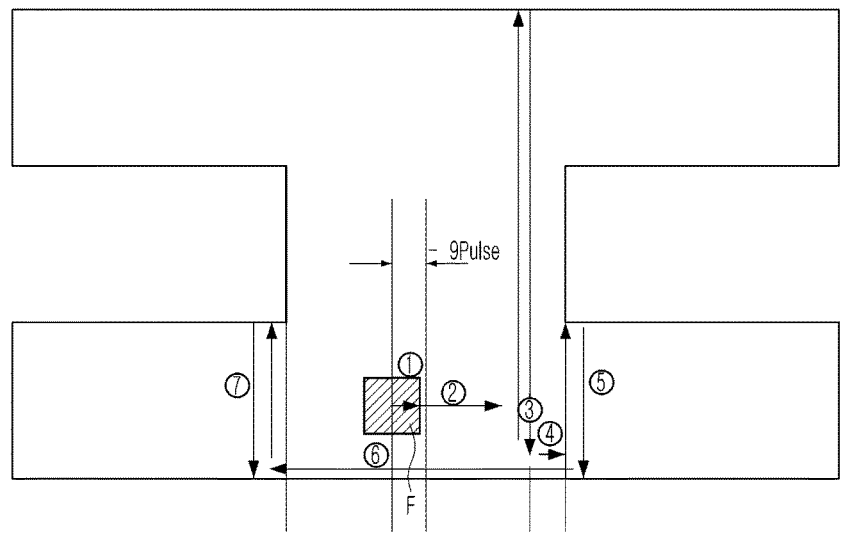

FIG. 7 illustrates a method of setting the reference position of an actuator when the finger F is located close to an opposite end with respect to the reference position, especially in the case where the signal value of Hall sensors is different from a reference signal value. Since the signal value of Hall sensors is initially different from the reference signal value, the controller moves the finger F to one end in a shifting direction so that the signal value of the Hall sensors becomes identical to the reference signal value (①). Thereafter, the controller moves the finger F to the one end in the shifting direction by a preset distance (②), and checks whether a selecting operation is enabled at the moved position of the finger F (③). At this time, since the selecting operation is enabled at the moved position of the finger F, the controller performs position correction by further moving the finger F to the one end in the shifting direction by a specific distance (④). Thereafter, the controller again checks whether a selecting operation is enabled at the moved position of the finger F (⑤). If it is checked that a selecting operation is not enabled, the controller moves the finger F to the opposite end in the shifting direction by a distance that is twice the preset distance (⑥). Thereafter, the controller checks whether a selecting operation is enabled at the moved position of the finger F (⑦). If it is checked that when a selecting operation is not enabled at the moved position of the finger F, the controller may initialize the reference position of the shifting actuator by moving the finger F to the one end in the shifting direction by the preset distance.

Figure 8:
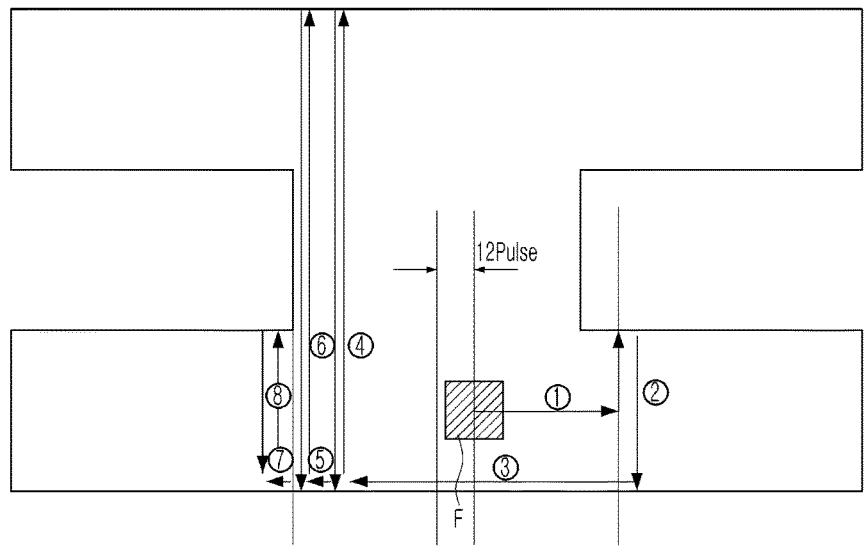

FIG. 8 illustrates a method of setting the reference position of an actuator when the finger F is located close to one end with respect to the reference position, and shows the case where the signal value of Hall sensors is identical to a reference signal value. Since the signal value of Hall sensors is identical to the reference signal value, the controller immediately moves the finger F to one end in a shifting direction by a preset distance (①). Thereafter, the controller checks whether a selecting operation is enabled at the moved position of the finger F (②). If it is checked that a selecting operation is not enabled, the controller moves the finger F to an opposite end in the shifting direction by a distance that is twice the preset distance (③). Thereafter, the controller checks whether a selecting operation is enabled at the moved position of the finger F (④). Since the selecting operation is enabled, the controller moves the finger F to the opposite end in the shifting direction by a specific distance (⑤), and again checks whether a selecting operation is enabled (⑥). If it is checked that the selecting operation is also enabled, the controller moves the finger F by a specific distance (⑦), and checks whether a selecting operation is enabled (⑧). If a selecting operation is not enabled, the controller may complete an operation of correcting the reference position of the shifting actuator by moving the finger F to the one end in the shifting direction by the preset distance.

For reference, the controller may be implemented as a Transmission Control Unit (TCU).

In accordance with the method of setting the reference position of the actuator in the automated manual transmission, having the above configuration, the position of a shifting actuator may be initialized to a reference position without performing gear engagement. As a result, the time required to set the reference position of the shifting actuator may be reduced, and noise caused by gear engagement may also be reduced.

Although the embodiments of the present disclosure have been disclosed for illustrative purposes, those skilled in the art will appreciate that various modifications, additions and substitutions are possible, without departing from the scope and spirit of the present disclosure.

What is claimed is:

1. A method of setting a reference position of an actuator in an automated manual transmission, comprising:
    performing Hall signal comparison by comparing, by a controller, a signal value of Hall sensors with a reference signal value;
    performing a first movement by moving, by the controller, a finger of the actuator to a first end in a shifting direction by a preset distance when the signal value of the Hall sensors is identical to the reference signal value as a result of performing the Hall signal comparison;
    performing a first selection checking by checking, by the controller, whether a selecting operation is enabled at a moved position of the finger after the first movement;
    performing a second movement by moving, by the controller, the finger to a second end in the shifting direction by a distance that is twice the preset distance when a selecting operation is not enabled as a result of performing the first selection checking;
    performing a second selection checking by checking, by the controller, whether a selecting operation is enabled at a moved position of the finger after the second movement; and
    performing a third movement by moving, by the controller, the finger to the first end in the shifting direction by the preset distance when a selecting operation is not enabled as a result of performing the second selection checking.

2. The method of claim 1, wherein the reference signal value is a signal value of the Hall sensors when the finger is located at the reference position during an End of Line (EOL) procedure.

3. The method of claim 1, further comprising:
    when the signal value of the Hall sensors is different from the reference signal value as a result of performing the Hall signal comparison, moving, by the controller, the finger in the shifting direction so that the signal value of the Hall sensors becomes identical to the reference signal value, and then performing the first movement.

4. The method of claim 1, wherein the preset distance is a distance by which the finger is moved in the shifting direction from a center portion of a selected clearance to a point deviating from the selected clearance.

5. The method of claim 1, further comprising:
    when the selecting operation is enabled as a result of performing the first selection checking, moving, by the controller, the finger to the first end in the shifting direction by a specific distance, and then again performing the first selection checking.

6. The method of claim 5, wherein the specific distance is a distance by which the finger is moved while a motor is rotating at an angle of approximately 360°.

7. The method of claim 1, further comprising:
when the selecting operation is enabled as a result of performing the second selection checking, moving, by the controller, the finger to the second end in the shifting direction by a specific distance, and then again performing the second selection checking.

8. The method of claim 7, wherein the specific distance is a distance by which the finger is moved while a motor is rotating at an angle of approximately 360°.

* * * * *